United States Patent [19]

Owades

[11] Patent Number: 5,308,638

[45] Date of Patent: May 3, 1994

[54] PROCESS FOR PRODUCING A MALT BEVERAGE HAVING IMPROVED CARBONATION-RETAINING PROPERTIES AND PRODUCT PRODUCED THEREFROM

[76] Inventor: Joseph L. Owades, 2164 Hyde St., San Francisco, Calif. 94109

[21] Appl. No.: 939,994

[22] Filed: Sep. 3, 1992

[51] Int. Cl.⁵ .............................................. A23L 1/185
[52] U.S. Cl. ................................... 426/592; 426/386; 426/387; 426/477; 426/638; 426/654
[58] Field of Search ............... 426/592, 638, 654, 386, 426/387, 477

[56] References Cited

U.S. PATENT DOCUMENTS

| 386,250 | 7/1888 | Kluber | 426/592 |
| 4,389,421 | 6/1983 | Palamand | 426/592 |

OTHER PUBLICATIONS

Furia et al., 1971, Fenaroli's Handbook of Flavor Ingredients. The Chemical Rubber Co., Cleveland, Ohio., pp. 17, 195, 196.

*Primary Examiner*—Helen Pratt
*Attorney, Agent, or Firm*—Hayes, Soloway, Hennessey, Grossman & Hage

[57] ABSTRACT

The carbonation-retaining properties of a malt beverage are improved by adding a mint factor to the beverage prior to packaging.

28 Claims, No Drawings

PROCESS FOR PRODUCING A MALT BEVERAGE HAVING IMPROVED CARBONATION-RETAINING PROPERTIES AND PRODUCT PRODUCED THEREFROM

FIELD OF THE INVENTION

The present invention relates generally to the production of malt beverages, and more particularly to the production of malt beverages having improved carbonation-retaining properties. The invention has particular utility in the production of beer and will be described in connection with such utility, although the invention may also advantageously be used in the production of other malt-based beverages.

DESCRIPTION OF THE PRIOR ART

During the production of beer, the action of yeast on the simple carbohydrates present in wort produces alcohol and carbon dioxide gas ($CO_2$). Most of the $CO_2$ produced escapes from the beer, but some of it remains dissolved. Later, after the beer is filtered, it is customary to adjust the level of carbonation by the judicious addition of gaseous $CO_2$ to the desired level. Alternatively, a "secondary" fermentation may be done under pressure, and the level of $CO_2$ desired in the finished beer is that produced by the "secondary" fermentation.

In either case, the $CO_2$ is dissolved in the liquid portion of the beer, either as merely dissolved $CO_2$ or as the hydrate, $H_2CO_3$. It is not common to distinguish between the dissolved gas and the hydrate because there must be a mobile equilibrium between the gas and the hydrate. At the pH of beer, 3.9–4.5, virtually none of the $CO_2$ exists as the bicarbonate, $HCO_3^-$. This is readily seen from the equilibrium constant for the dissociation of carbonic acid:

$$H_2CO_3 \rightleftharpoons H^+ + HCO_3^-$$

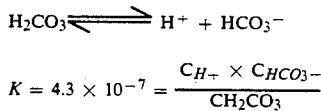

At 0° C., and assuming even that all of the $CO_2$ dissolved exists as the hydrate, (0.33 g/100 ml) and at a pH of 4, the concentration of $HCO_3^-$ is insignificant, 0.00032 mols/liter.

The solubility of gaseous $CO_2$ and oxygen have been extensively studied in human blood, because of their extreme importance in metabolism. While $O_2$ has a special transport vehicle, hemoglobin, the $CO_2$ is transported from the cells where it is produced, to the lungs where it is removed, by the simple bicarbonate ion. Elimination of the $CO_2$ in the lungs occurs because the pressure of the dissolved $CO_2$ in the blood is greater than in the lungs, and it is therefore released.

In a carbonated beverage, the $CO_2$ is either free or hydrated, and obeys Henry's Law of Gases, namely, $$m = p \times k$$

where:
m—mass of gas dissolved;
p—the pressure of the gas; and
k—a constant (0.57 for $CO_2$).

Carbonated beverages, such as beers, normally are packaged at cold temperatures, as close to 32° F. as possible, and under some pressure. The machinery used to package such beverages, either in cans, bottles or kegs, maintains a counterpressure on the beverage, so that the level of carbonation in the package is greater than it would be under atmospheric pressure. Typically, beer is filled at about 0.55% $CO_2$ by weight. Thus, when a commercial package of beer is opened and allowed to remain under atmospheric pressure, the level of $CO_2$ in the package falls to that corresponding to the solubility of $CO_2$ in the beverage under the pressure and temperature prevailing.

OBJECTS OF THE INVENTION

It is thus a primary object of the present invention to provide a novel and improved method for improving the $CO_2$ retaining properties of a malt-based beverage such as beer. Another object of the present invention is to provide a novel and improved method of increasing the carbonation life of a malt-based beverage. A specific object of the present invention is to provide a malt-based beverage which is characterized by improved $CO_2$ retaining properties.

The invention accordingly comprises the process involving the several steps and relation of one or more such steps with respect to each other, and the materials and products possessing the features, properties and relations of elements, all of which are exemplified in the detailed description, and scope of the application, which will be indicated in the claims.

BRIEF SUMMARY OF THE INVENTION

Generally, in accordance with the present invention, I have found the addition of a mint factor to a malt-based beverage slows the release of $CO_2$ in opened containers, and thus improves the $CO_2$ retaining property of such beverage.

DETAILED DESCRIPTION OF THE INVENTION

It has been found that the addition of a mint factor such as a volatile compound of the mint family, e.g. menthol (5-methyl-2-(1-methylethyl) cyclohexanol; 3-p-menthanol; l-menthol; hexahydro-thymol; or peppermint camphor), with or without the concomitant addition of an essential oil of the mint family such as oil of peppermint, *mentha piperita*, or any other essential oil of the mint family, e.g. *mentha spicata*, *mentha citrata*, or *mentha gentilis variegata* to a malt-based beverage such as beer slows the release of $CO_2$ in opened containers.

The mint factor may be added to the malt-based beverage at any stage in the processing prior to bottling, but preferably is added to the malt-based beverage just prior to packaging. Alternatively, the mint factor may be added to the malt-based factor concomitantly with the packaging. Preferably, but not necessarily, the mint factor is added dispersed in a syrup such as corn syrup or the like.

The $CO_2$ retaining properties of the malt-based beverage may be improved by addition of a volatile mint factor alone. Preferably, however, one or a mixture of volatile mint factors will be added together with one or a mixture of essential oils of the mint family. Generally, volatile mint factors are added in an amount in the range of about 0.1 to 3.0 or more grams per barrel of the malt-based beverage (31 gallons), preferably 0.5 to 1.5 grams per barrel, while mint essential oil factors are added in an amount in the range of about 0.2 to 6.0 or more grams per barrel of the malt-based beverage, preferably about 1.0 to 3.0 grams per barrel. Addition of less than about 0.1 grams of volatile mint factors and/or about 0.2 grams of mint essential oil factors per barrel of the malt-based beverage generally results in only marginal improvement in $CO_2$ retaining properties of the beverage, while addition of in excess of about 3.0 grams per barrel of volatile mint factors and/or 6.0 grams per barrel of mint essential oil factors appears to provide little additional improvement in $CO_2$ retaining properties of the beverages over addition of lesser amounts.

The reason why the addition of mint factors to a malt-based beverage improves $CO_2$ retaining properties of the beverage is not known. However, it is believed that the mint factors may be involved in solvation with the $CO_2$. Interestingly, addition of mint factors to club soda or other non-malt-based beverages does not appear to provide any improvement in $CO_2$ retaining properties of such beverages.

The resulting malt-based beverage has superior $CO_2$ retaining properties over a similar beverage made without the addition of the mint factors.

The present invention will be further described in the following working examples.

EXAMPLE I

One hundred bbls. of otherwise finished beer is treated with a mixture of 100 g. of menthol and 150 g. of peppermint oil, both dispersed in 33 liters of high fructose corn syrup. The treated beer is packaged in 12 oz. bottles, and the bottles containing the treated beer are marked, and stored with bottles of untreated beer from the same batch.

EXAMPLE II

One thousand bbls. of finished malt liquor is treated with a mixture of 500 g. of menthol, 700 g. of peppermint oil and 250 g. of spearmint oil, all dispersed in 150 liters of corn syrup. The treated malt liquor is packaged in 12 oz. bottles, and the bottles containing the treated malt liquor are marked, and stored with bottles of untreated malt liquor from the same batch.

The bottled malt beverages from Examples I and II are opened and compared to untreated bottled malt beverages from the same batch, and tested for $CO_2$ retention properties. In each case the beverage is opened at 20° C., and the $CO_2$ content measured by the titrimetric method of Canizzaro (Bull. Anc. Et. Brass. Louvain, 29, 70 (1929). Additional samples are opened and held at cold (20° C.) storage and $CO_2$ volumes measured at timed intervals. Untreated controls immediately after opening were found to have 2.1 volumes of $CO_2$, while the beverages treated with mint factors in accordance with Examples I and II were found to contain 2.3 volumes of $CO_2$.

After two hours the untreated controls contained 1.9 volumes of $CO_2$ whereas the beverages treated with mint factors in accordance with Examples I and II contained 2.1 volumes of $CO_2$. After three hours, the untreated controls contained 1.8 volumes of $CO_2$, while the beverages treated with mint factors in accordance with Examples I and II contained 2.0 volumes of $CO_2$.

It is thus seen that the addition of mint factors to a malt-based beverage improves the $CO_2$ retaining properties of the beverages.

Certain changes may be made without departing from the scope of the invention herein involved. For example, while the invention has been illustrated in connection with the production of conventional alcoholic beer or malt liquor, it should be understood that the invention advantageously may be employed in connection with the production of non-alcoholic beer as well as other malt-based beverages. It is therefore intended that all matter contained in the above description shall be interpreted as illustrative and not in a limiting sense.

I claim:

1. A method of improving the $CO_2$ retaining properties of a malt-based beverage which comprises adding to the malt-based beverage prior to packaging about 0.1 to about 6.0 grams of a mint factor per barrel of beverage, wherein said mint factor is selected from the group consisting of at least one essential oil of the mint family, at least one volatile compound of the mint family, and mixtures thereof.

2. A method according to claim 1, wherein said mint factor comprises menthol.

3. A method according to claim 1, wherein said essential oil is selected from the group consisting of *mentha piperita, mentha spicata, mentha citrata,* and *mentha gentilis variegata.*

4. A method according to claim 1, wherein said volatile compound is added in an amount in the range of from about 0.1 to about 3.0 grams per barrel.

5. A method according to claim 4, wherein said volatile compound is added in an amount in the range of from about 0.5 to about 1.5 grams per barrel.

6. A method according to claim 1, wherein said essential oil is added in an amount in the range of from about 0.2 to about 6.0 grams per barrel.

7. A method according to claim 6, wherein said essential oil is added in an amount in the range of from about 1.0 to about 3.0 grams per barrel.

8. A method according to claim 1, wherein said mint factor is added dispersed in a syrup.

9. A method according to claim 8, wherein said syrup comprises corn syrup.

10. A method of improving the $CO_2$ retaining properties of a malt-based beverage which comprises adding to the malt-based beverage a mixture of mint factors comprising mint volatiles and mint essential oils.

11. A method according to claim 10, wherein said mint factor comprises a volatile compound of the mint family.

12. A method according to claim 11, wherein said volatile compound of the mint family comprises menthol.

13. A method according to claim 10, wherein said mint factor comprises an essential oil of the mint family.

14. A method according to claim 13, wherein said essential oil is selected from the group consisting of *mentha piperita, mentha spicata, mentha citrata,* and *mentha gentilis variegata.*

15. A method according claim 10, wherein said mint factor comprises a mixture of one or more volatile compounds of the mint family and one or more essential oils of the mint family.

16. A method according to claim 15, wherein said volatile compound is added in an amount in the range of from about 0.1 to about 3.0 grams per barrel.

17. A method according to claim 16, wherein said volatile compound is added in an amount in the range of from about 0.5 to about 1.5 grams per barrel.

18. A method according to claim 15, wherein said essential oil is added in an amount in the range of from about 0.2 to about 6.0 grams per barrel.

19. A method according to claim 18, wherein said essential oil is added in an amount in the range of from about 1.0 to about 3.0 grams per barrel.

20. A method according to claim 10, wherein said mint factor is added dispersed in a syrup.

21. A method according to claim 20, wherein said syrup comprises corn syrup.

22. A malt-based beverage having improved $CO_2$ retaining properties comprising sufficient quantities of mint factors to produce improved $CO_2$ retaining properties, wherein said mint factor is selected from the group consisting of at least one volatile compound of the mint family, at least one essential oil of the mint family, and mixtures thereof.

23. A beverage according to claim 22, wherein said volatile compound of the mint family comprises menthol.

24. A beverage according to claim 22, wherein said essential oil is selected from the group consisting of *mentha piperita, mentha spicata, mentha citrata,* and *mentha gentilis variegata.*

25. A beverage according to claim 22, wherein said volatile compound is present in an amount in the range of from about 0.1 to about 3.0 grams per barrel.

26. A beverage according to claim 25, wherein said volatile compound is present in an amount in the range of from about 0.5 to about 1.5 grams per barrel.

27. A beverage according to claim 22, wherein said essential oil is present in an amount in the range of from about 0.2 to about 6.0 grams per barrel.

28. A beverage according to claim 27, wherein said essential oil is present in an amount in the range of from about 1.0 to about 3.0 grams per barrel.

* * * * *